United States Patent
Li et al.

(10) Patent No.: US 10,972,302 B2
(45) Date of Patent: *Apr. 6, 2021

(54) SCALABLE COMPUTING SYSTEMS FOR GENERATING NOTIFICATIONS, AND METHODS OF OPERATING THEREOF

(71) Applicant: Wealthsimple Technologies Inc., Toronto (CA)

(72) Inventors: Karney Li, Toronto (CA); Marco Costa, Toronto (CA); John Cartright, Toronto (CA); Marek Kudlacz, Toronto (CA)

(73) Assignee: Wealthsimple Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,271

(22) Filed: Nov. 4, 2019

(65) Prior Publication Data
US 2020/0204388 A1    Jun. 25, 2020

Related U.S. Application Data

(63) Continuation of application No. 15/948,331, filed on Apr. 9, 2018, now Pat. No. 10,469,279.

(51) Int. Cl.
*H04L 12/18*    (2006.01)
*H04L 12/26*    (2006.01)
*H04L 29/08*    (2006.01)

(52) U.S. Cl.
CPC .......... *H04L 12/1895* (2013.01); *H04L 43/16* (2013.01); *H04L 67/10* (2013.01)

(58) Field of Classification Search
CPC ......... H04L 67/18; H04L 41/22; H04L 51/04; H04L 65/403; H04L 51/36; H04L 51/32; G06F 1/329; G06F 1/3228
See application file for complete search history.

(56) References Cited

U.S. PATENT DOCUMENTS

| | | | |
|---|---|---|---|
| 10,469,279 B2* | 11/2019 | Li | H04L 12/1895 |
| 2017/0139382 A1* | 5/2017 | Sayyarrodsari | G05B 23/024 |
| 2018/0181183 A1* | 6/2018 | Yoon | G06F 1/3296 |

OTHER PUBLICATIONS

Pichora, "OANDA/oflux", GitHub, <https://github.com/oanda/oflux>, dated Jul. 16, 2012, retrieved Jun. 18, 2018.

(Continued)

*Primary Examiner* — Kim T Nguyen
(74) *Attorney, Agent, or Firm* — Bereskin & Parr LLP/S.E.N.C.R.L., s.r.l.

(57) ABSTRACT

A scalable computing system for generating notifications for each account of a plurality of accounts, and method of operating thereof, are provided. The system involves: a database for storing: an action definition defining operations executable to determine at least one parameter of one or more actions, and a processor operable to: instantiate an independent management process for the action definition, wherein each management process is configured to: monitor a state of each operation defined in the action definition; identify a worker process associated with the management process to perform each operation based on the state of the operation; and assign the identified worker process to perform the respective operation; and upon detecting a predefined condition in each independent management process, transmit, via a network to a remote node, the one or more notifications for the respective independent management process.

24 Claims, 6 Drawing Sheets

(56) References Cited

OTHER PUBLICATIONS

Burns et al., "Flux: A Language for Programming High-Performance Servers", Proceedings: 2006 USENIX Annual Technical Conference, pp. 129-142, Berkeley, CA, USA, 2006.

* cited by examiner

SCALABLE COMPUTING SYSTEMS FOR GENERATING NOTIFICATIONS, AND METHODS OF OPERATING THEREOF

CROSS-REFERENCE TO RELATED APPLICATIONS

The present application is a continuation of U.S. application Ser. No. 15/948,331 filed on Apr. 9, 2018, which is incorporated by reference herein in its entirety.

FIELD

The described embodiments relate to a scalable computing system for generating notifications, and methods of operating thereof.

BACKGROUND

Computing systems are frequently used to speed batch processing of functions and calculations. However, in many cases, the amount of data to be processed may grow at a rate that exceeds the ability of the computing system to scale. To address the growing load requirements, additional physical resources are typically required. However, in some cases, the addition of physical resources may not be sufficient to maintain a performance level of a computing system due to its design limitations.

SUMMARY

The various embodiments described herein generally relate to scalable computing systems for generating one or more notifications for each of a plurality of accounts, and methods of operating thereof.

In accordance with some embodiments, there is provided a scalable computing system including: a database for storing: an action definition defining one or more operations executable to determine at least one parameter of one or more actions; and a processor in communication with the database, the processor being operable to: instantiate an independent management process for the action definition of each account of the plurality of accounts managed by the scalable computing system, wherein each management process is configured to: monitor a state of each operation defined in the action definition; identify a worker process associated with the management process to perform each operation based on the respective state of the operation; and assign the identified worker process to perform the respective operation; and upon detecting a predefined condition in each independent management process, transmit, via a network to a remote node, the one or more notifications for the respective independent management process.

In some embodiments, the management process is configured to: determine the state of each operation defined in the respective action definition; and identify an operation with an incomplete status.

In some embodiments, the management process is configured to: determine a load parameter of each operation, the load parameter indicating a processing capacity required for performing the respective operation; identify one or more worker processes capable of satisfying the load parameter; and select a worker process from the identified one or more worker processes for performing the operation.

In some embodiments, the management process is configured to: determine a machine type associated with the load parameter; and identify the one or more worker processes available at a machine associated with the machine type.

In some embodiments, the management process is configured to: determine whether an operating capacity of the identified one or more worker processes exceeds a capacity threshold; and in response to determining the operating capacity exceeds the capacity threshold, delay the performance of the operation until the operating capacity does not exceed the capacity threshold.

In some embodiments, to delay the performance of the operation, the management process is configured to: assign a wait state to that operation.

In some embodiments, the one or more operations defined by the action definition involves an notification generator operation; and the management process is configured to identify the worker process to perform the notification generator operation, wherein the notification generator operation includes: receiving one or more parameters for the one or more notifications from at least one other operation defined by the action definition; and generating the one or more notifications based on the one or more parameters.

In some embodiments, the one or more operations defined by the action definition involves at least one of a risk profile determination operation, a portfolio determination operation, a position determination operation, a fee determination operation, an account status determination operation, and an order submission operation.

In some embodiments, the processor is operable to instantiate two or more management processes, each management process being associated with a different set of worker processes.

In some embodiments, the management process is associated with one or more worker processes selectable by the management process for performing a respective operation defined by the action definition.

In some embodiments, the independent management process is configured to implement a state machine for the respective action definition.

In accordance with some embodiments, there is provided a method of operating a scalable computing system to generate one or more notifications for each of a plurality of accounts. The method includes: operating a processor to instantiate an independent management process for an action definition of each account of the plurality of accounts managed by a scalable computing system, the action definition defining one or more operations executable to determine at least one parameter of one or more actions, wherein each management process is configured to: monitor a state of each operation defined in the action definition; identify a worker process associated with the management process to perform each operation based on the respective state of the operation; and assign the identified worker process to perform the respective operation; and operating the processor to, upon detecting a predefined condition in each independent management process, transmit, via a network to a remote node, the one or more notifications for the respective independent management process.

In some embodiments, the management process is configured to: determine the state of each operation defined in the respective action definition; and identify an operation with an incomplete status.

In some embodiments, the management process is configured to: determine a load parameter of each operation, the load parameter indicating a processing capacity required for performing the respective operation; identify one or more worker processes capable of satisfying the load parameter;

and select a worker process from the identified one or more worker processes for performing the operation.

In some embodiments, the management process is configured to: determine a machine type associated with the load parameter; and identify the one or more worker processes available at a machine associated with the machine type.

In some embodiments, the management process is configured to: determine whether an operating capacity of the identified one or more worker processes exceeds a capacity threshold; and in response to determining the operating capacity exceeds the capacity threshold, delay the performance of the operation until the operating capacity does not exceed the capacity threshold.

In some embodiments, to delay the performance of the operation, the management process is configured to: assign a wait state to that operation.

In some embodiments, the one or more operations defined by the action definition includes an notification generator operation; and the management process is configured to identify the worker process to perform the notification generator operation, wherein the notification generator operation includes: receiving one or more parameters for the one or more notifications from at least one other operation defined by the action definition; and generating the one or more notifications based on the one or more parameters.

In some embodiments, the one or more operations defined by the action definition includes at least one of a risk profile determination operation, a portfolio determination operation, a position determination operation, a fee determination operation, an account status determination operation, and an order submission operation.

In some embodiments, the methods disclosed herein include operating the processor to instantiate two or more management processes, each management process being associated with a different set of worker processes.

In some embodiments, the management process is associated with one or more worker processes selectable by the management process for performing a respective operation defined by the action definition.

In some embodiments, the independent management process is configured to implement a state machine for the respective action definition.

In some embodiments, the methods disclosed herein include storing the action definition in a database accessible by the processor.

BRIEF DESCRIPTION OF THE DRAWINGS

Several embodiments will now be described in detail with reference to the drawings, in which.

Figure 1:
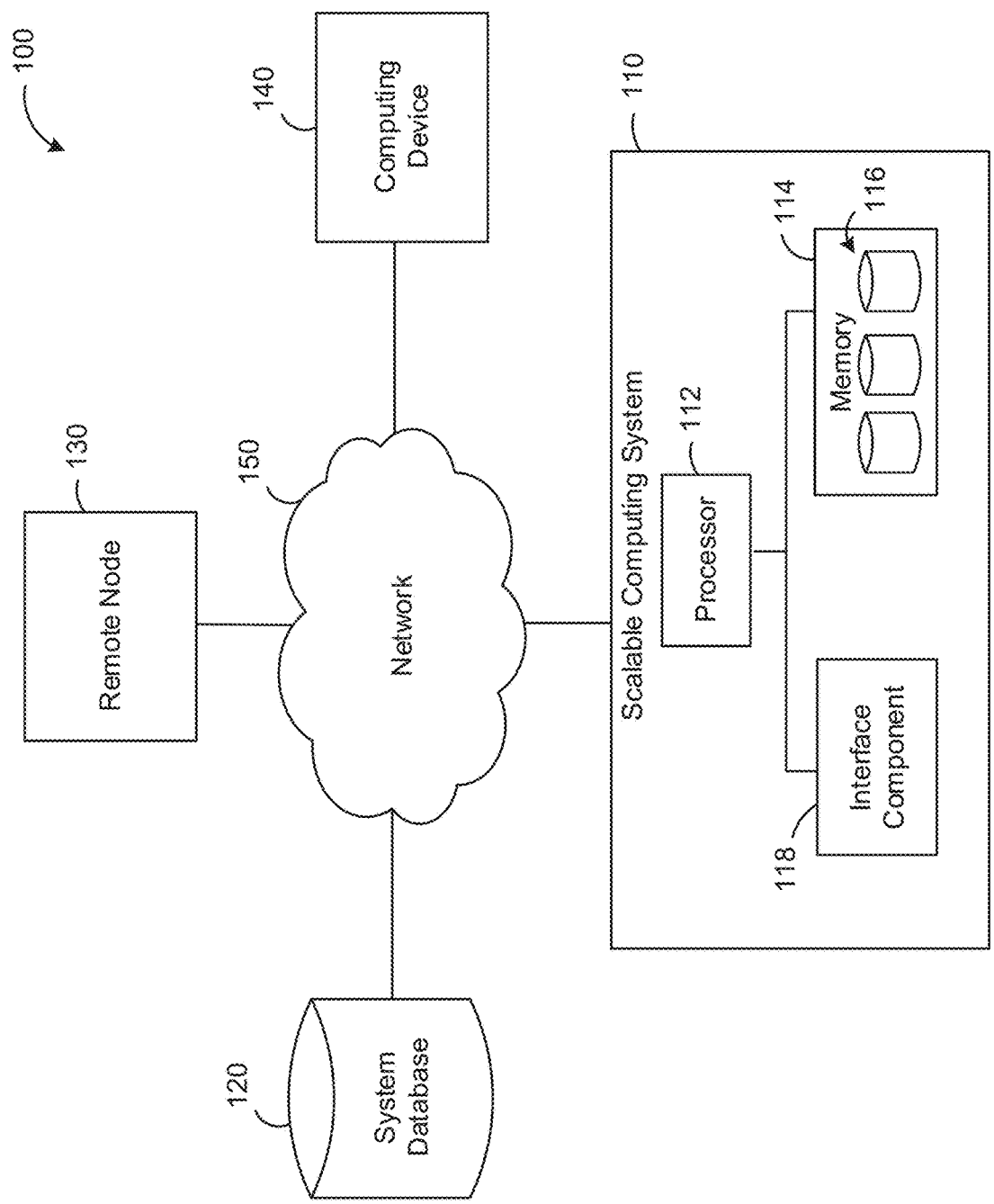
FIG. 1 is a block diagram of components interacting with an example scalable computing system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to scalable computing systems for generating one or more notifications (and associated methods for providing the systems).

Computing systems are designed to satisfy various requirements, such as load capacity and performance speed. When those computing systems need to process a larger amount of data, their scalability can be limited by the original design and/or hardware scalability. For example, when a computing system operates based on a single process, it may be difficult to adapt that computing system for parallel processing (e.g., multi-threaded processes). Instead, to adapt that example computing system for larger processing loads, higher performing hardware resources are likely required.

In a computing system for automatically performing trades, for example, the computing system can be designed to automatically evaluate and trade an initial number of client accounts according to a single process. When the number of client accounts grows, it can be difficult to scale this automatic trading system in a way that can maintain the originally design performance. The addition of higher performance hardware resources can be one way to scale the automatic trading system but the hardware resources also come with procurement and maintenance costs, and other issues.

Similarly, a computing system that monitors and manages a manufacturing process, for example, can be difficult to adapt to variation in data processing needs. Typical computing systems designed for a manufacturing process are linear in design and any addition to the load can severely reduce the processing speed. The designs of these computing systems tend to be rigid and so, any variations in the manufacturing process may require a complete redesign of the computing systems.

Also, the design of computing systems typically considers specific factors related to the application of that computing system. For example, in the context of an automatic trading system, the different time zones of the stock markets can limit the amount of time available for the trades to be evaluated and traded. Also, depending on the region associated with a client account, different regulations may apply, which must be considered by the trade evaluation process. For example, when the automatic trading system considers tax-loss harvesting (TLH) in Canada, the system will typically only require data from the last 30 days, but in the United States, the automatic trading system will require data from a full calendar year due to American short-term and long-term capital gains tax rules.

The described embodiments generally provide systems and methods for scalable computing. The scalable computing may be provided by carrying out a state-machine "workflow". The workflow may be implemented by a plurality of independent workflow instances. Each workflow instance can be, paused, resumed, cancelled or restarted without affecting other instances. Each workflow instance can run in parallel with other instances.

Scaling of workflow instances can be accomplished by several techniques. A first technique is to provide a collection of micro services for carrying out each step of a workflow. Each micro service can be written with a desired technology and language to carry out a discrete action. In a cloud-based environment, these different micro services can be provisioned onto hardware optimized for the specific tasks they accomplish.

For example, a computationally heavy action can be deployed onto a machine with a high performing central processing unit (CPU). Each of these micro services can scale and provision additional machines to complete tasks in parallel at a faster rate.

A second technique is to subdivide the state machine component into a management process and worker processes. The management process generally keeps track of all the tasks to be completed and assigns tasks to available worker processes. The worker processes take the tasks and execute the tasks using the various micro services described herein. Additional groups of management process and associated worker processes can be provisioned to handle more tasks. The management process can also load-balance and delay the execution of certain tasks to avoid overloading the underlying micro services.

A further technique is to partition source data across different databases and services. Accessing large volumes of data can create bottlenecks when multiple processes attempt to retrieve data from a particular database or service. Partitioning data into multiple databases and services allows for workflows to work off completely isolated data sets, thus avoiding the problem of a large bottleneck.

Reference is now made to FIG. 1, which illustrates a block diagram 100 of components interacting with an example scalable computing system 110. The scalable computing system 110 can be in communication with at least one computing device 140, a remote node 130 and a system database 120 via a network 150.

The computing devices 140 may be any networked device operable to connect to the network 150. A networked device may couple to the network 150 through a wired or wireless connection.

The computing device 140 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The network 150 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the computing device 140, the remote node 130, the system database 120 and the scalable computing system 110.

The scalable computing system 110, the computing device 140, the remote node 130 and the system database 120 may connect to the network 150 or a portion thereof via suitable network interfaces. For example, the computing device 140 can include a connected or "smart" device capable of data communication, such as thermostats, air quality sensors, industrial equipment and the like.

The remote node 130 can include networked equipment, a software-as-a-service server (SaaS server) and/or other computing system (with at least a processor, a memory and a network interface) for receiving the notifications generated by the scalable computing system 110. In some embodiments, the remote node 130 can include one or more computing systems operable by the scalable computing system 110 to perform some or all of an operation defined within the action definition. Example computing systems are described with reference to FIG. 3. It should be understood that although only one remote node 130 is shown, there may be multiple remote nodes 130 distributed over a wide geographic area and connected via the network 150.

An example networked equipment can include an industrial machine, facilities equipment, sensor, or any other machine that can be connected to the network 150. The networked equipment can include a processor, such as a microcontroller, a memory that may include volatile and non-volatile elements, and at least one network interface. The networked equipment may include additional input or output devices, in some embodiments.

Like the networked equipment, the SaaS server has a processor, volatile and non-volatile memory, at least one network interface, and may have various other input/output devices. In many cases, the SaaS server may be constructed from a server farm, which may be in geographically diverse locations, and accessed via a load balancer. Such arrangements are sometimes referred to as "cloud" services. In general, the SaaS server provides one or more software applications, and may be accessed by one or more device from within the network 150 and occasionally from outside of network 150.

As used herein, the term "software application" or "application" refers to computer-executable instructions, particularly computer-executable instructions stored in a non-transitory medium, such as a non-volatile memory, and executed by a processor. The processor, when executing the instructions, may receive inputs and transmit outputs to any of a variety of input or output devices to which it is coupled. Within an organization, a software application may be recognized by a name by both the people who use it, and those that supply or maintain it. A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs. For example, for many organizations, important applications and services rely on regular input from spreadsheets that may be obtained from third parties, so these spreadsheets may be identified as software applications.

The system database 120 can act as a back-up database for the data stored in the memory 114 of the scalable computing system 110, and/or storing data that may not be as frequently used.

The scalable computing system 110 includes a processor 112, an interface component 118 and a memory 114. The processor 112, the interface component 118 and the memory 114 can communicate with each other. The memory 114, as shown, can include one or more databases 116. In FIG. 1, the scalable computing system 110 is shown as one element for ease of exposition. It should be understood that there may be multiple scalable computing systems 110 distributed over a wide geographic area and connected via the network 150.

It will be understood that, in some embodiments, each of the processor 112, the interface component 118, and the memory 114 may be combined into a fewer number of components or may be separated into further components. Furthermore, the processor 112, the interface component 118, and the memory 114 may be implemented in software or hardware, or a combination of software and hardware.

The processor 112 may be any suitable processors, controllers or digital signal processors that can provide sufficient processing power depending on the configuration, purposes and requirements of the scalable computing system 110. In some embodiments, the processor 112 can include more than one processor with each processor being configured to perform different dedicated tasks.

The processor 112 can be configured to control the operation of the scalable computing system 110. The processor 112 can initiate and manage the operations of each of the interface component 118 and the memory 114.

The interface component 118 may be any interface that enables the scalable computing system 110 to communicate with other devices and systems. In some embodiments, the interface component 118 can include at least one of a serial port, a parallel port or a USB port. The interface component 118 may also include at least one of an Internet, Local Area Network (LAN), Ethernet, Firewire, modem or digital subscriber line connection. Various combinations of these elements may be incorporated within the interface component 118.

For example, the interface component 118 may receive input from various input devices, such as a mouse, a keyboard, a touch screen, a thumbwheel, a track-pad, a track-ball, a card-reader, voice recognition software and the like depending on the requirements and implementation of the scalable computing system 110.

The memory 114 can include RAM, ROM, one or more hard drives, one or more flash drives or some other suitable data storage elements such as disk drives, etc. The memory 114 can be used to store an operating system and software applications. For instance, the operating system can provide various basic operational processes. The programs can include various user programs so that a user can interact with the interface component 118 to perform various functions such as, but not limited to, viewing and/or responding to the notifications generated by the scalable computing system 110.

The memory 114 can store data related to the accounts associated with the scalable computing system 110, for example. The accounts can relate to a user, and/or a specific product or project whose status is being monitored by the scalable computing system 110. For example, an account can be associated with a product being manufactured in an assembly line, a project whose status is being monitored, or an investment account being automatically evaluated for trades.

Figure 2:
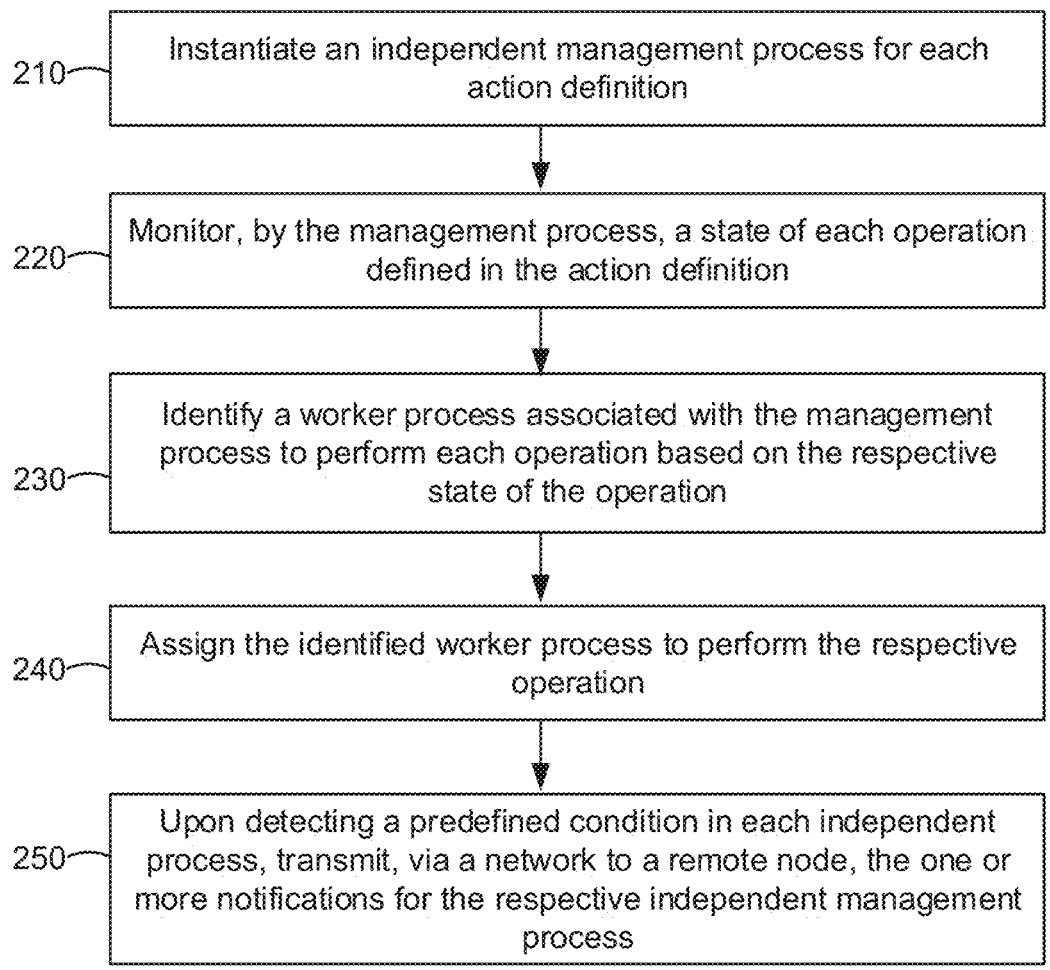
FIG. 2 is a flowchart of an example embodiment of various methods of operating a scalable computing system.
Figure 3:
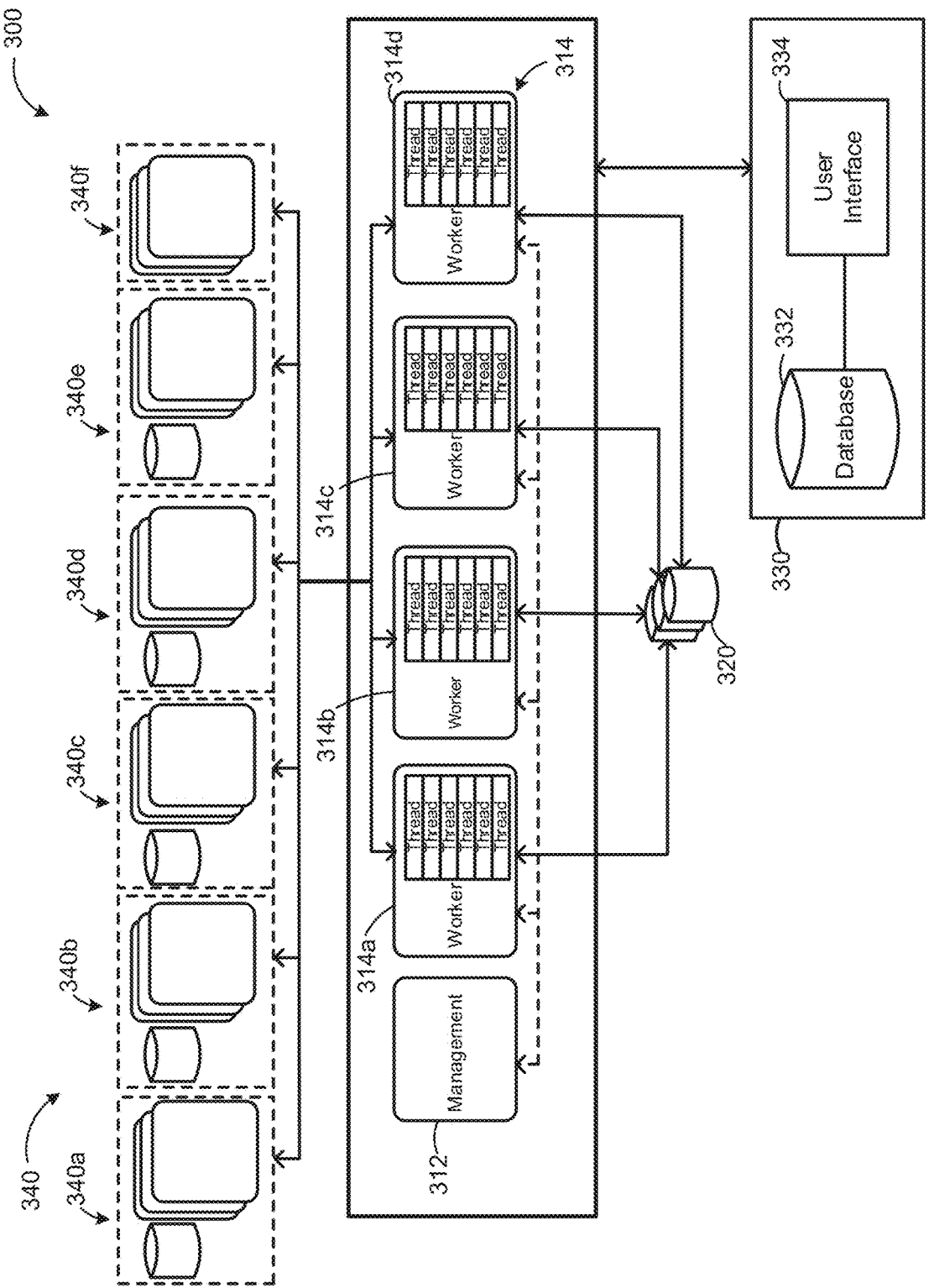
FIG. 3 is an example data flow diagram in accordance with an example embodiment.

An example method of operating the scalable computing system 110 will now be described with reference to FIGS. 2 and 3. FIG. 2 is a flowchart of an example method 200 of operating the scalable computing system 110. FIG. 3 illustrates an example data flow diagram 300 for the scalable computing system 110.

For each account, the scalable computing system 110 can operate according to an action definition to generate notifications for that account.

The action definition defines operations executable to determine at least one parameter of the notifications to be generated. The action definition can also define the variables that are required by the remote computing systems 340 triggered by a worker process 314, and/or the responses that should be stored in the database 116/120. The action definition can be stored in the database 116 and/or 120, for example.

Each operation defined in the action definition is responsible for a set of behaviours and/or actions that form the parameters of the notifications. For example, the operations can involve gathering and/or processing data from the remote computing systems 340 and/or triggering the remote computing systems 340 to gather and/or process specific data. The architecture of each remote computing systems 340 can be based on a collection of coupled services, such as, but not limited to a service-oriented architecture (SOA) or a micro services architecture. The services available at the remote computing systems 340 can be triggered to perform the actions needed for the respective operation.

One example action definition for a trading environment is provided in Table 1, below. The example action definition is provided using the Javascript Object Notation (JSON) format. However, other formats may be used as desired.

TABLE 1

Example action definition

```
{
    "name": "trading_workflow",
    "initial_context": [
        "account_ids"
    ],
    "start_state": "get_name",
    "states": [
        {
            "service": "profile_service",
            "action": "get_risk_profiles",
            "response_data": [
                "investment_profiles"
            ],
            "transitions": {
                "success": "get_model_portfolios"
            }
        },
        {
            "service": "portfolio_service",
            "action": "get_model_portfolios",
            "request_data": [
                "account_ids",
                "investment_profiles"
            ],
            "response_data": [
                "target_portfolios"
            ],
            "transitions": {
                "success": "get_account_states"
            }
        },
        {
            "service": "portfolio_service",
            "action": "get_account_states",
            "request_data": [
                "account_ids"
            ],
            "response_data": [
                "account_states"
            ],
            "transitions": {
                "success": "get_positions"
            }
        },
```

TABLE 1-continued

Example action definition

```
        {
            "service": "books_service",
            "action": "get_positions",
            "request_data": [
                "account_ids"
            ],
            "response_data": [
                "positions"
            ],
            "transitions": {
                "success": "get_fee_structure"
            }
        },
        {
            "service": "fee_service",
            "action": "get_fee_structure",
            "request_data": [
                "account_ids",
                "target_portfolios"
            ],
            "response_data": [
                "fee_structures"
            ],
            "transitions": {
                "success": "calculate_orders"
            }
        },
        {
            "service": "order_calculator",
            "action": "calculate_orders",
            "request_data": [
                "account_ids",
                "investment_profiles",
                "target_portfolios",
                "account_states",
                "positions",
                "fee_structures"
            ],
            "response_data": [
                "orders"
            ],
            "transitions": {
                "success": "submit_orders"
            }
        },
        {
            "service": "submit_orders",
            "action": "calculate_orders",
            "request_data": [
                "orders"
            ],
            "transitions": {
                "success": "done"
            }
        },
        {
            "state_name": "done",
            "terminal": true
        }
    ]
}
```

As will be described, an operation in an example application of the scalable computing system 110 for an automatic trading environment can include triggering a remote computing system 340 to gather data related to the accounts, calculate one or more orders, generate orders, determine a risk profile, determine a portfolio, determine a position determination, determine a fee, determine an account status, and submit an order. Another example scalable computing system 110 can be in the manufacturing process. Example operations in the manufacturing process can include triggering a remote computing system 340 to receive the supplies required to manufacture the product, an availability status of components required to manufacture a product, a readiness for shipping of the product, etc. In some embodiments, the operations can include a notification generator operation.

The notifications can include, but is not limited to, alerts that can be displayed via the remote node 130 for a user for review, and/or an indication of a status of the account being monitored. An example remote user node 330 is shown in FIG. 3. The example remote user node 330 includes a database 332 and a user interface 334. It will be understood that other implementations of the remote user node 330 can be used.

Each operation can be triggered by a worker process 314 to be executed at a remote computing system 340. In some embodiments, the scalable computing system 110 can select remote computing systems 340 that have resources appropriate for the execution of the operation. For example, operations that involve intense data processing can be assigned to a remote computing system 340 with high processing resources.

The operations associated with each account can be divided between the remote computing systems 340a to 340f. In the illustrated example, each remote computing system 340a to 340e includes respective databases and applications (e.g., a collection of services), and remote computing system 340f includes applications only. The remote computing systems 340a to 340e can be suitable for operations involving retrieving large amount of data, for example, while remote computing system 340f can be assigned to computational-heavy operations. Although six remote computing systems 340 are shown in FIG. 3, it will be understood that fewer or a greater number of remote computing systems 340 can be used.

Each instance of the action definition operates independently from another instance and can run in parallel with other instances. Each instance of the action definition can be paused, resumed, cancelled, inspected, or restarted without affecting other instances. Any failures that may occur during the execution of an action definition for an account will not affect the operations being conducted for the other accounts.

Each remote computing system 340 can be defined using an external resource definition, which may contain information regarding the capabilities and constraints of each remote computing system 340. For example, the external resource definition may contain information regarding how to authenticate with the remote computing system, what protocols may be used (e.g., PostgreSQL, HTTP, ZeroMQ, S3, GraphQL, etc.), or, optionally, information regarding resource availability (e.g., maximum load or connections). Depending on the protocol definition, an authentication attribute may be specified to indicate an authentication method to be used (e.g., for HTTP, the authentication attribute may indicate Basic, Digest or NTLM authentication).

As noted above, external resource definitions may be used to inform the management process how it may interact with other services. External resource definitions may be used to indicate resource limits that may be imposed by third party services operated by a different entity (e.g., a third party web server with an API that limits the maximum number of concurrent connections) and which may not scale in a predictable manner.

Examples of resource limits that may be specified in an external resource definition may include a maximum amount of concurrent connections, a maximum transaction size (e.g., defining how many items can be committed in one transaction), and a maximum request size (e.g., defining how many items can be fetched in one request). For HTTP or URL-based services, additional route definitions may be provided for a subset of queries, such as a maximum request size, a maximum rate (e.g., defining how many requests can be made within a predefined time period), a cache length (e.g., defining the period of time to store received data in order to avoid repeated requests for the same information), and a cache size (e.g., defining how many data items to store before discarding items).

Table 2 illustrates an example external resource definition in accordance with some embodiments.

TABLE 2

Example external resource definition

```
"data_store": {
    "protocol": "postgresql",
    "url": "https://data.example.com",
    "username": "<username>",
    "password": "<password>",
    "config": {
        "max_connections": 100,
        "max_insert_size": 10000,
        "max_request_size": 1000,
    }
},
"data_service": {
    "protocol": "http",
    "url": "https://data.example.com",
    "auth": "api-auth",
    "access_id": "<access_id>",
    "secret_key": "<secret_key>",
    "config": {
        "max_connections": 100,
        "routes": {
            "default": {
                "default": {
                    "max_request_size": 250,
                }
            }
        }
    }
},
"third_party_service": {
    "protocol": "http",
    "url": "https://api.external.com",
    "auth": "basic-auth",
    "username": "<username>",
    "password": "<password>"
},
"brokerage_service": {
    "protocol": "http",
    "url": "https://api.brokerage.com",
    "auth": "oauth2",
    "access_token": "<access_token>",
    "refresh_token": "<refresh_token>",
    "config": {
        "routes": {
            "/account/<param>": {
                "put": {
                    "max_rate": 1
                },
                "get": {
                    "max_rate": 30,
                    "max_request_size": 15,
                    "cache_length": 600,
                    "cache_size": 100,
                }
            },
            "default": {
                "default": {
                    "max_rate": 30,
                    "max_request_size": 5,
                }
            }
        }
    }
}
```

At 210, the Processor 112 Instantiates an Independent Management Process 312 for Each Action Definition.

The management process 312 can be configured to implement a state machine for the respective action definition. The management process 312 is associated with one or more worker processes 314a to 314d that execute the operations assigned to them by the management process 312. Each action definition relates to an account.

When the processor 112 instantiates the management process 312 for the action definition, the management process 312 can receive initial data related to the account and the action definition. The initial data can include an initial account data set and an initial state. Each operation defined in the action definition is associated with various states, such as in-operation state, incomplete state, wait state, or complete state. Based at least on the initial data and the action definition, the management process 312 can track the status of the operations defined in the respective action definition with the state machine. The state machine can provide a record of each state change. The records can be stored in the database 320 shown in FIG. 3, for example. The database 320 can include the database 116 of the scalable computing system 110 and/or the system database 120. Diagrams of example state machines will be described with reference to FIGS. 4 to 6.

In some embodiments, the processor 112 can instantiate two or more management processes 312. When the operations defined in the action definition requires more resources, the processor 112 can be triggered to instantiate more management processes 312 to handle those operations. Each management process 312 of the two or more management processes 312 is associated with a different set of worker processes 314.

At 220, Monitor, by the Management Process 312, a State of Each Operation Defined in the Action Definition.

During the performance of the operations by the respective worker process 314, the worker process 314 can update a status of the operation in the database 320. The worker process 314 can also include in the database 320 activity data, such as the data received and/or transmitted during the performance of the operation.

The management process 312 can determine, from the database 116/120, the state of each operation defined in the respective action definition. The management process 312 can then identify an operation with an incomplete state, for example.

An operation can be assigned a wait state. For example, the management process 312 can determine that the operation is time dependent and can limit the availability of the performance of that operation to a later time. The wait state can be used in situations when the scalable computing system 110 needs to be time zone aware. For example, in an automatic trading environment, the stock markets start at different time zones and so, the scalable computing system 110 can designate the operations that are affected by the variations in the time zones to take place at different times. In the manufacturing environment, the scalable computing system 110 can designate operations that require manual oversight to take place while workers are present, while operations that do not require manual oversight to take place while workers are not present.

At 230, Identify, by the Management Process 312, a Worker Process 314 Associated with the Management Process 312 to Perform Each Operation Based on the Respective State of the Operation.

The management process 312 assigns each worker process 314 to an operation. The worker process 314 then performs the operation. For example, in a scalable computing system 110 for conducting automatic trading, an operation related to fetching positions is more limited to input/output (I/O) operations. In contrast, an operation related to order calculation requires more computing processing.

In some embodiments, as shown in FIG. 3, a worker process 314 can be implemented with multiple threads. The multiple threads facilitate parallel computing at each of the worker processes 314. Although the worker processes 314 shown in FIG. 3 each show multiple threads, it will be understood that there can be implementations of the worker processes 314 without multiple threads and/or only one or more worker process 314 with multiple threads.

The management process 312 can select at least one worker process 314 to perform an operation defined by the action definition. When selecting the worker processes 314, the management process 312 can consider the load parameters of the operation and identify one or more worker processes 314 that can satisfy those load parameters. Load parameters generally indicate a processing capacity required for performing the operation. From the identified worker processes 314 that can satisfy those load parameters, the management process 312 can select a worker process 314 from the identified worker processes 314 to perform the operation.

In some embodiments, the management process 312 can determine a machine type associated with the load parameter and select the worker process 314 available at a machine associated with that machine type.

The management process 312 can also analyze the action definition and identify any operations that do not depend on each other. The management process can assign those independent operations to respective worker processes 314 that can perform those operations in parallel. Example independent operations can include data gathering operations.

The management process 312 can also operate to balance the load as defined by the action definition as between the worker processes 314. For example, the management process 312 can delay the execution of one or more operations to avoid overloading the worker processes 314 and/or the remote computing systems 340 that are required for the operation by the worker processes 314. In some cases, the management process 312 may also focus or divert management or worker resources to other tasks or steps to spread operating capacity.

In some embodiments, the management process 312 can determine whether an operating capacity of the identified worker processes 314 exceeds a capacity threshold. If the operating capacity does exceed the capacity threshold, the management process 312 can delay the performance of the operation until the operating capacity does not exceed the capacity threshold. To delay the performance of the operation, the management process 312 can assign a wait state to that operation.

At 240, Assign, by the Management Process 312, the Identified Worker Process 314 to Perform the Respective Operation.

When performing the operation, the worker process 314 can trigger communication with the remote computing systems 340 to assist with the operation.

These remote computing systems 340 can be virtual machines communicating via the network 150. The remote computing systems 340 can also scale to address the specific needs of the scalable computing system 110. For example, the remote computing systems 340 can be adapted with additional computing systems to enable the completion of the operations in parallel and at a faster rate.

When accessing large volumes of data, bottlenecks can result when the data is being retrieved from a database or from a particular remote computing system 340. With the described scalable computing system 110, the different instances of the management processes 312 for each action definition enables the source data to be partitioned and split across different databases or remote computing systems 340. In some embodiments, the instances of the management processes 312 can be configured to access isolated datasets to minimize bottleneck in the data retrieval and/or data processing.

At least some of the data processing and/or gathering relevant to the generation of the notifications are shared among the remote computing systems 340. As a result, when the scalable computing system 110 is faced with a larger amount of data, the remote computing systems 340 can be independently scaled. For example, when the operation assigned to a worker process 314 becomes more computationally intensive, the worker process 314 can be configured to trigger a remote computing system 340 with a high performing central processing unit (CPU).

In some embodiments, a worker process 314 may require a dataset from the remote computing system 340 in order to perform the operation. In another example, a worker process 314 may be required to trigger the remote computing system 340 to perform an action before that worker process 314 can perform the operation. In another example, the worker process 314 can determine, from the operation assigned, the data that may be required by the remote computing systems 340 and/or from other operations previously performed.

In response to the trigger by the worker process 314*a*, for example, a remote computing device, such as 340*c*, can respond with at least a transition indicator to indicate the subsequent step to be performed. The remote computing system 340*c* can also respond with relevant data, depending on the operation.

As the worker processes 314 perform the respective operations, the worker processes 314 will collect various datasets that are relevant to the parameters of the notification(s) to be generated by the scalable computing system 110. The processor 112 can store the data gathered by the worker process 314 into the database 320.

Figure 4:
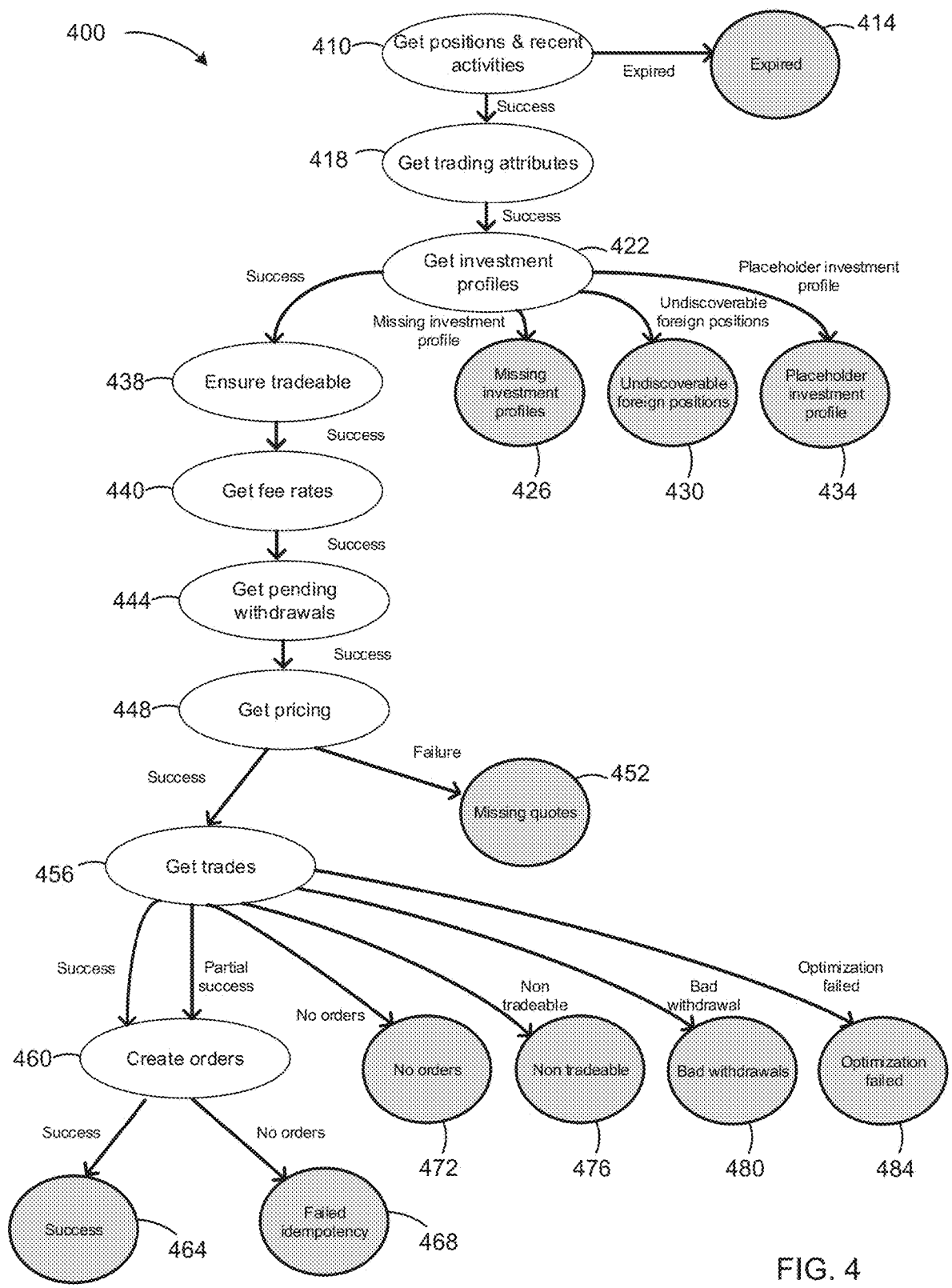
FIG. 4 is an example state machine diagram for an order generation service in accordance with an example embodiment.

Reference will now be made to FIG. 4 for an example embodiment of operating the scalable computing system 110 for generating a notification related to a trading order for an example investment account.

As will be described with reference to FIG. 4, an example notification generator operation can include receiving parameters for the notifications from at least one other operation defined by the action definition. The notification generator operation can generate the notifications based on the received parameters.

FIG. 4 is a state machine diagram 400 illustrating various operations conducted by the scalable computing system 110 and the subsequent operations following a specific state obtained at a prior operation. The state of each operation and the associated data obtained as a result of the operation are stored by the processor 112 into the database 320. The management process 312 can track the state of each operation by referring to the database 320.

At 410, an operation involves retrieving data related to positions and recent activities of the account. The management process 312 can determine that operation 410 involves triggering a remote computing system 340 for retrieving the position and recent activity data, and can select a worker process 314 suitable for data retrieval, such as worker process 314*a*. To retrieve the position and recent activity data, the worker process 314a can trigger a communication with a remote computing system 340 with access to a database in which the position and recent activity data is stored, such as remote computing system 340a.

In response to the trigger generated by the worker process 314a, the remote computing system 340a can respond with the position and recent activity data and a transition indicator to indicate the subsequent step. As shown in FIG. 4, the transition indicator received from the remote computing system 340a can be "success", which indicates that operation 418 is then performed.

However, if the remote computing system 340a does not respond to the request from the worker process 314a within a predefined time limit, the worker process 314a can store in the database 320 an expired state for the operation 410. The management process 312 can cause the worker process 314a to restart the operation 410 at a later time.

Similar to operation 410, the management process 312 can determine that operation 418 involves triggering a remote computing system 340 for retrieving the trading attribute data, and can select a worker process 314 suitable for data retrieval, such as worker process 314b. In some embodiments, worker process 314a can also be assigned to operation 418. For example, a different thread of the worker process 314a can be assigned to operation 410 and operation 418, respectively. In another example, the worker process 314a can perform operations 410 and 418 in sequence.

To retrieve the trading attribute data, the worker process 314b can trigger a communication with a remote computing system 340 with access to a database in which the trading attribute data is stored, such as remote computing system 340b. In some embodiments, both remote computing systems 340a and 340b can have access to both the trading attribute data and the position and recent activity data. The worker process 314b can trigger a communication with either of the remote computing systems 340a or 340b.

In response to the trigger generated by the worker process 314b, the remote computing system 340b can respond with the trading attribute data and a transition indicator to indicate the subsequent step. As shown in FIG. 4, the transition indicator received from the remote computing system 340b can be "success", which indicates that operation 422 is then performed.

Operation 422 involves retrieving investment profiles. For example, the investment profile can relate to a United States or Canadian market, various account types (e.g., individual retirement accounts (IRAs), tax-free savings accounts (TFSAs), registered retirement savings plans (RRSPs), 401 k accounts, non-registered accounts, etc.), target portfolios and/or fixed fee structures.

The management process 412 can determine that operation 422, similar to operations 410 and 418, involves data retrieval and can assign any worker process 314 suitable for data retrieval. Unlike operations 410 and 418, operation 422 is associated with at least four different transition indicators, namely success, missing investment profile, undiscoverable foreign positions and placeholder investment profile. Each of these transition indicators indicates a different subsequent step. As shown in FIG. 4, the subsequent operation when the operation 422 returns the transition indicator indicating "success" is operation 438, which involves ensuring the account is tradeable. However, when the operation 422 returns the transition indicator indicating "missing investment profiles", "undiscoverable foreign positions" or "placeholder investment profile", the respective states 426, 430 and 434 are stored in the database 320. The management process 312 can then review these states 426, 430 and 434, and trigger the corresponding resolutions.

Continuing with operation 438, as shown in FIG. 4, each of subsequent operations 440 (retrieve fee rates), 444 (retrieve pending withdrawals) and 448 (retrieve pricing) involves data retrieval. The management process 412 can, therefore, assign worker processes 314 that are suitable for operations 440, 444, and 448.

When the management process 312 determines that the operation 438 is associated with a success state, the management process 312 can trigger the assigned worker process 314 to perform operation 440. Similarly, the management process 312 can trigger the assigned worker process 314 to perform operation 444 when the operation 440 is associated with a success state.

When the transition indicator associated with the operation 448 is "success," the management process 312 causes operation 456 to be performed. When the transition indicator associated with the operation 448 is "failure," the operation 448 is associated with a missing quotes state 452. The management process 312 can then trigger the necessary resolution for addressing resolving the missing quotes state 452.

The operation 456 involves determining trades. The management process 312 can determine that operation 456 involves analyzing the data retrieved from at least one of the other operations 410, 418, 422, 438, 440, 444 and 448 for determining the trades. As no further data retrieval may be needed, the management process 312 can select a worker process, such as 314f, which is designed to accommodate high computational speeds.

As shown in FIG. 4, operation 456 is associated with at least six different transition indicators, such as success, partial success, no orders, non-tradeable, bad withdrawal and optimization failed. When the worker process 314 assigned to the operation 456 returns the transition indicator "success" or "partial success", the subsequent operation is 460 (to create orders). For the other transition indictors (e.g., no orders, non-tradeable, bad withdrawal and optimization failed), a respective state 472, 476, 480 and 484 are stored in the database 320. As with operations 422 and 448, the management process 312 can then review the states 472, 476, 480 and 484, and trigger the corresponding resolutions.

Figure 5:
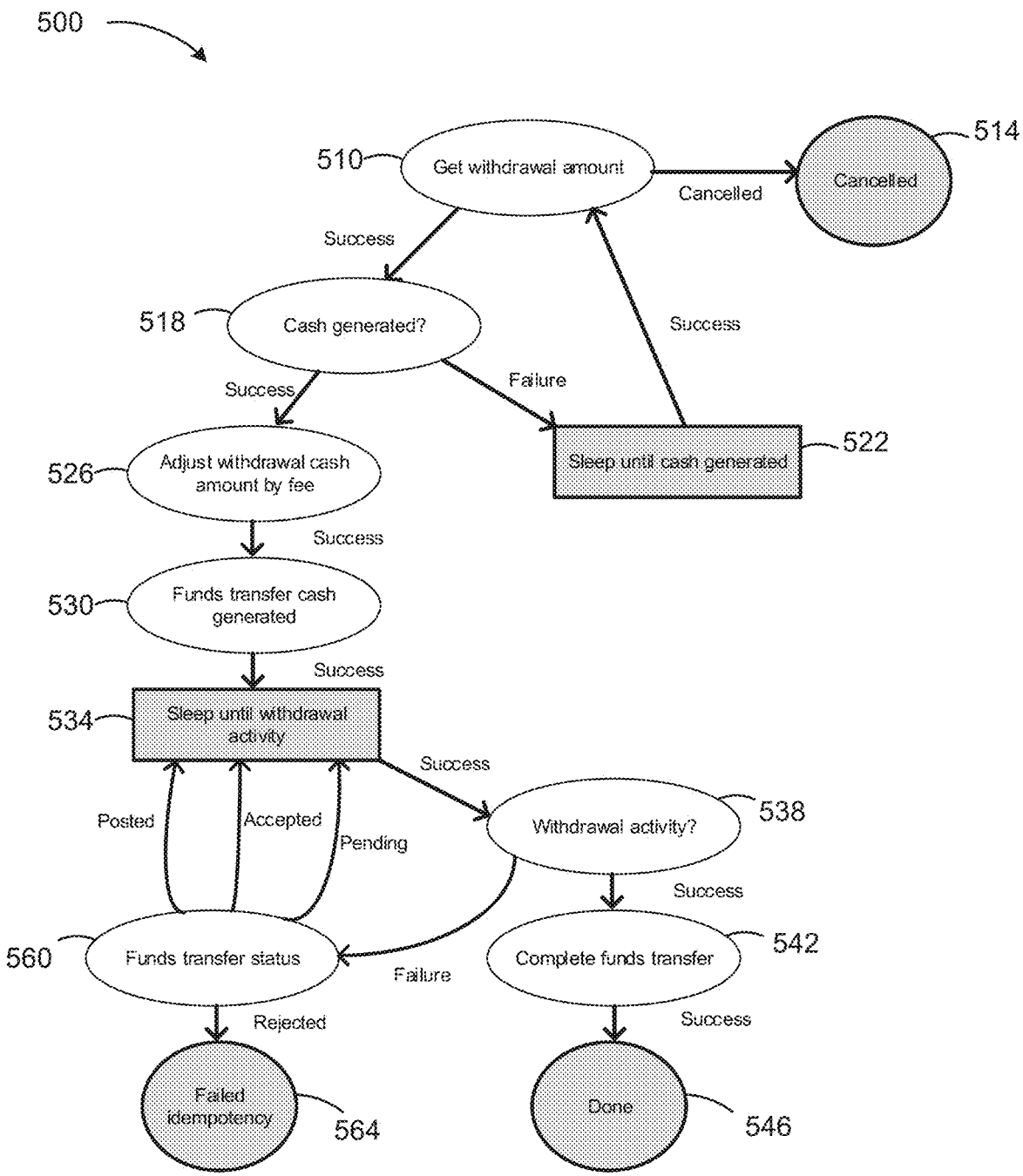
FIG. 5 is an example state machine diagram for a withdrawal service in accordance with an example embodiment and FIG. 6 is an example state machine diagram for a manufacturing process in accordance with an example embodiment.

Referring now to FIG. 5, which is a state machine diagram 500 for an example embodiment of operating the scalable computing system 110 for generating notifications related to a withdrawal service.

At 510, operation involves getting a withdrawal amount. When the worker process 314 assigned to operation 510 by the management process 312 receives a transition indicator indicating the operation 510 is success, the management process 312 can cause operation 518 to be performed. When the worker process 314 generates a cancelled transition indicator to the management process 312, the management process 312 can assign a cancelled state 514 to the operation 510.

Operation 518 involves determining whether the cash has been generated. In the case that the transition indicator returned by the assigned worker process 314 is failure, the operation 518 is assigned the state 522 "sleep until cash generated". When the management process 312 determines that the state 522 has been resolved, the management process 312 causes operation 510 to be performed again.

When the transition indicator returned by the assigned worker process 314 is success, operation 526 (adjust withdrawal cash amount by fee) is performed, followed by operation 530 (funds transfer cash generated) when operation 526 is assigned a "success" transition indicator.

When the operation 530 is assigned a "success" transition indicator, the management process 312 assigns the operation 530 to a state 534, which is to sleep until a withdrawal activity takes place. When the management process 312 determines that the state 534 is associated with a "success" transition indicator, the management process 312 causes operation 538 to confirm a withdrawal activity took place.

When operation 538 is associated with a "success" transition indicator, the management process 312 causes performance of operation 542 by the assigned worker process 314. Operation 542 involves completing the funds transfer. However, if operation 538 is associated with a "failure" transition indicator, the management process 312 causes the performance of operation 560 by the assigned worker process 314, which is to confirm the funds transfer status. If operation 560 is assigned any one of posted, accepted or pending states, the management process 312 can resume the state 534. Otherwise, if operation 560 is assigned the state "rejected" 564, the management process 312 can indicate that the withdrawal process has failed.

Figure 6:
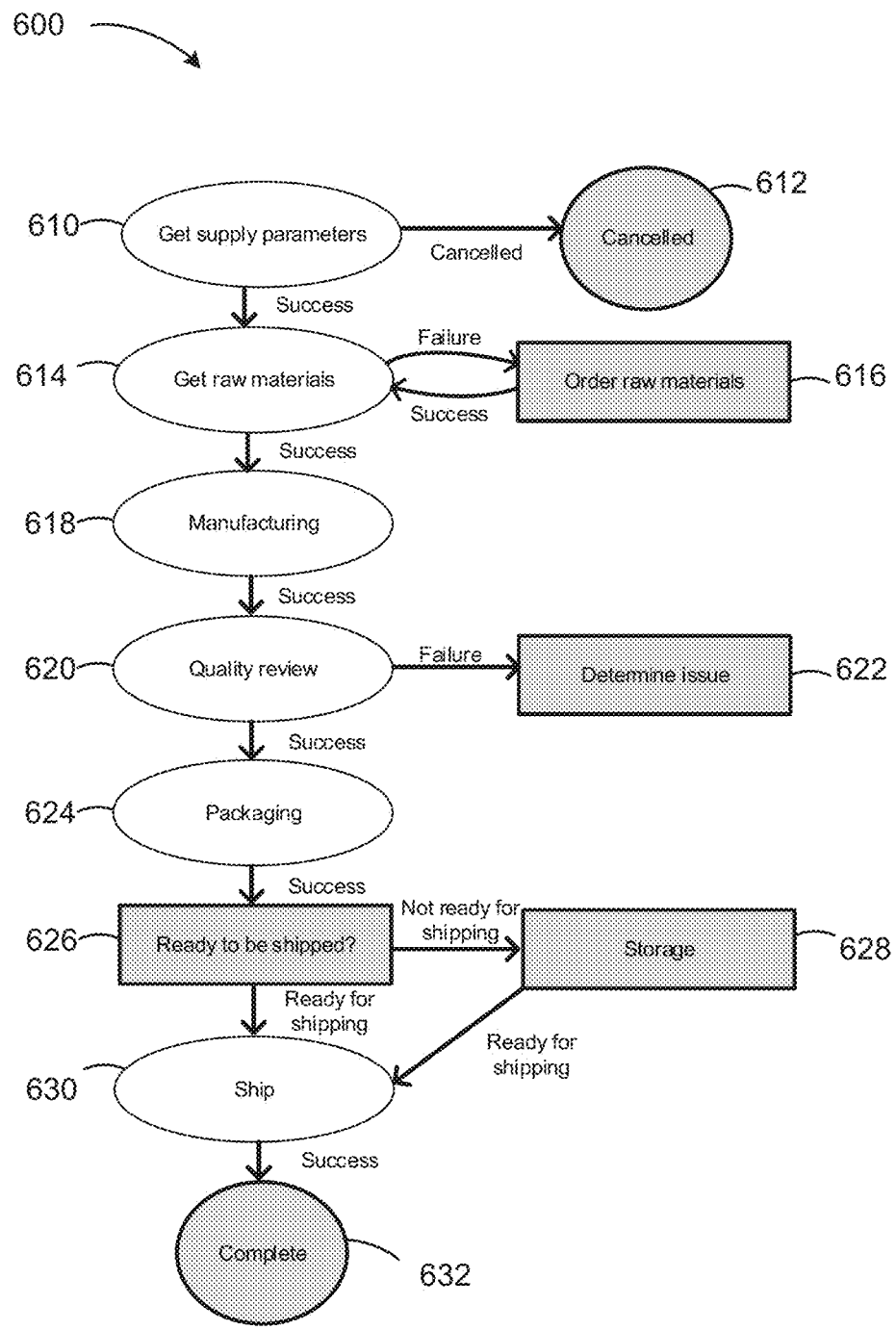

Reference is now made to FIG. 6 for a description of an example application of the scalable computing system 110 for monitoring a manufacturing process. FIG. 6 shows an example state diagram 600.

At 610, the processor 112 receives supply parameters related to a manufacturing process. The management process 312 can determine that operation 610 involves triggering a remote computing system 340 for retrieving the supply parameters. To retrieve the supply parameters, the worker process 314a can trigger a communication with a remote computing system 340 with access to a database in which the supply parameters is stored, such as remote computing system 340a.

In response to the trigger generated by the worker process 314a, the remote computing system 340a can respond with the position and recent activity data and a transition indicator to indicate the subsequent step. As shown in FIG. 6, the transition indicator received from the remote computing system 340a can be "success", which indicates that operation 614 is then performed, or that the operation 610 is cancelled, resulting in state 612. The operation 610 can be cancelled when the processor 112 receives a cancellation signal or generates a cancellation signal, and/or the worker process 314a does not respond within a predefined time period, for example.

Similar to operation 610, the management process 312 can determine that operation 614 involves triggering a remote computing system 340 to trigger the retrieval of the raw materials, and can select a worker process 314 suitable for triggering the retrieval of the raw materials, such as worker process 314b. Depending on the manufacturing process, the worker process 314 can trigger one or more robotic devices to automatically retrieve the necessary raw materials from a storage area or facility.

When the worker process 314b returns a "success" transition indicator, the management process 312 can proceed to the next operation 618, namely manufacturing.

However, if the worker process 314b returns a "failure" transition indicator, the management process 312 proceeds to an order raw materials state 616. The worker process 314b can return the "failure" transition indicator when there are insufficient raw materials in storage, for example. When the order raw materials state 616 is successful, the management process 312 again triggers operation 614.

At 618, the management process 312 can trigger a remote computing system 340 to trigger the manufacturing to occur. For example, a worker process 314c selected by the management process 312 can trigger an assembly line to initiate the manufacturing process and/or one or more robotic devices stationed at the assembly line to initiate the manufacturing process.

When the worker process 314c returns a "success" transition indicator, the management process 312 proceeds to operation 620. At 620, the management process 312 selects a worker process, such as worker process 314d, to trigger a quality review of the result of the manufacturing process. For example, the worker process 314d selected by the management process 312 can trigger one or more robotic devices to conduct the quality review. When worker process 314d returns a "failure" transition indicator, such as an defective product or a product with features that do not satisfy a standard, the management process 312 proceeds to a determine issue state 622. The determine issue state 622 can involve a manual review and/or test of the product at issue and, if appropriate, repairing the product at issue to resolve the issue.

When the worker process 314d returns a success transition indicator, the management process 312 proceeds to operation 624. At 624, the management process 312 can select a worker process, such as 314e, to trigger the packaging of the products resulting at 620. The worker process 314e can trigger the operation of robotic devices to perform the packaging, in some embodiments. When the worker process 314d returns a success transition indicator, the management process 312 proceeds to 626.

At 250, the Processor 112, Upon Detecting a Predefined Condition in Each Independent Management Process 312, Transmits the Notifications for the Independent Management Process 312 to a Remote Node 130 Via the Network 150.

Referring again to FIG. 4, following a return of the transition indicator "success" or "partial success", the management process 312 can perform operation 460. When the operation 460 is associated with the state "success", the management process 312 can determine that the notification generator operation is complete 464. That is, for the example notification generator operation, the predefined condition is associated with successfully creating an order and upon detecting the predefined condition, the scalable computing system 110 can determine that the predefined condition is satisfied. In this example, the management process 312 can generate notifications in the forms of trade orders for transmission to the remote node 130, such as a brokerage.

In the case that no orders are generated, the operation 460 is associated with a failed state 468 and no orders are generated. The management process 312 may transmit a notification to the remote user node 330, which may be a user interface, to indicate no orders have been generated.

Referring again to FIG. 5, once operation 542 is associated with a "success" transition indicator, the management process 312 generates a notification to indicate that the withdrawal process being monitored is complete 546. Following determining by the management process 312 that the operation 560 is assigned the state "rejected" 564, the management process 312 can indicate that the withdrawal process has failed and generate a corresponding notification to indicate the failure to the remote note 130.

Referring again to FIG. 6, at 626, the management process 312 determines whether the packaged product is ready to be shipped. If the product is ready to be shipped, the management process 312 proceeds to 630. If the product is not ready to be shipped, the management process 312 proceeds to store the products in storage 628. At 630, the management process 312 can trigger a worker process, such as 314*f*, to trigger one or more robotic devices for preparing the packaged products for shipping and to generate a notification to the remote node 130 to indicate that the product has shipped. When the worker process 314*f* returns a success transition indicator, the management process 312 proceeds to a complete state 632.

It will be appreciated that numerous specific details are set forth in order to provide a thorough understanding of the example embodiments described herein. It will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

Unless the context requires otherwise, the word "include" as used throughout this specification, and variations thereof, such as "includes" and "including," are to be construed in an open, inclusive sense, that is as "including, but not limited to."

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A scalable computing system for generating one or more notifications, the scalable computing system comprising:
   a first processor;
   a second processor in communication with the first processor, the first processor being operable to:
     execute a plurality of independent management processes, wherein a first management process of the plurality of independent management processes corresponds to a first action definition of a plurality of action definitions, and the first management process is configured to:
       monitor a state of at least one operation defined in the first action definition;
       for a first operation of the at least one operation, identify a first worker process to perform the first operation, based on a state of the first operation, and assign the first worker process to perform the first operation; and
     upon detecting a predefined condition in at least one of the plurality of independent management processes, transmit, to the second processor, the one or more notifications.

2. The scalable computing system of claim 1, wherein the first management process is configured to:
   determine the state of the at least one operation defined in the first action definition; and
   identify an incomplete status of the first operation.

3. The scalable computing system of claim 1, wherein the first management process is configured to:
   determine a load parameter of the first operation, the load parameter indicating a processing capacity required for performing the first operation;
   identify one or more worker processes capable of satisfying the load parameter, wherein the first worker process satisfies the load parameter.

4. The scalable computing system of claim 3, wherein the first management process is configured to:
   determine a machine type associated with the load parameter; and
   identify the one or more worker processes available at a machine associated with the machine type, wherein the first worker process is at the machine associated with the machine type.

5. The scalable computing system of claim 3, wherein the first management process is configured to:
   determine whether an operating capacity of the one or more worker processes exceeds a capacity threshold; and
   in response to determining the operating capacity exceeds the capacity threshold, delay the performing the first operation until the operating capacity does not exceed the capacity threshold.

6. The scalable computing system of claim 5, wherein, to delay the performing the first operation, the first management process is configured to:
   assign a wait state to the first operation.

7. The scalable computing system of claim 1, wherein:
   each of the at least one operation is executable to determine at least one parameter of one or more actions, wherein the at least one operation defined in the first action definition comprises a notification generator operation; and
   the first management process is configured to identify the first worker process to perform the notification generator operation, wherein the notification generator operation comprises:
      receiving one or more parameters for the one or more notifications from at least one other operation defined in the first action definition; and
      generating the one or more notifications based on the one or more parameters.

8. The scalable computing system of claim 7, wherein:
   the at least one operation defined in the first action definition comprises at least one of a risk profile determination operation, a portfolio determination operation, a position determination operation, a fee determination operation, an account status determination operation, and an order submission operation.

9. The scalable computing system of claim 1, wherein the first processor is operable to execute two or more management processes, each management process being associated with a different set of worker processes.

10. The scalable computing system of claim 1, wherein the first management process is associated with one or more worker processes selectable by the first management process for performing the first operation defined by the first action definition.

11. The scalable computing system of claim 1, wherein the first management process is configured to implement a state machine for the first action definition.

12. A method of operating a scalable computing system to generate one or more notifications, the method comprising:
   executing a plurality of independent management processes, wherein a first management process of the plurality of independent management processes corresponds to a first action definition of a plurality of action definitions, and the first management process is configured to:
      monitor a state of at least one operation defined in the first action definition;
         for a first operation of the at least one operation, identify a first worker process to perform the first operation, based on a state of the first operation, and assign the first worker process to perform the first operation; and
      upon detecting a predefined condition in at least one of the plurality of independent management processes, transmit, to a second processor, the one or more notifications.

13. The method of claim 12, wherein the first management process is configured to:
   determine the state of the at least one operation defined in the first action definition; and
   identify an incomplete status of the first operation.

14. The method of claim 12, wherein the first management process is configured to:
   determine a load parameter of the first operation, the load parameter indicating a processing capacity required for performing the first operation;
   identify one or more worker processes capable of satisfying the load parameter, wherein the first worker process satisfies the load parameter.

15. The method of claim 14, wherein the first management process is configured to:
   determine a machine type associated with the load parameter; and
   identify the one or more worker processes available at a machine associated with the machine type, wherein the first worker process is at the machine associated with the machine type.

16. The method of claim 14, wherein the first management process is configured to:
   determine whether an operating capacity of the one or more worker processes exceeds a capacity threshold; and
   in response to determining the operating capacity exceeds the capacity threshold, delay the performing the first operation until the operating capacity does not exceed the capacity threshold.

17. The method of claim 16, wherein, to delay the performing the first operation, the first management process is configured to:
   assign a wait state to the first operation.

18. The method of claim 12, wherein:
   each of the at least one operation is executable to determine at least one parameter of one or more actions, wherein the at least one operation defined in the first action definition comprises a notification generator operation; and
   the first management process is configured to identify the first worker process to perform the notification generator operation, wherein the notification generator operation comprises:
      receiving one or more parameters for the one or more notifications from at least one other operation defined in the first action definition; and
      generating the one or more notifications based on the one or more parameters.

19. The method of claim 18, wherein:
   the at least one operation defined in the first action definition comprises at least one of a risk profile determination operation, a portfolio determination operation, a position determination operation, a fee determination operation, an account status determination operation, and an order submission operation.

20. The method of claim 12, further comprising executing two or more management processes, each management process being associated with a different set of worker processes.

21. The method of claim 12, wherein the first management process is associated with one or more worker processes selectable by the first management process for performing the first operation defined by the first action definition.

22. The method of claim 12, wherein the first management process is configured to implement a state machine for the first action definition.

23. The method of claim 12, further comprising storing the first action definition in a database.

24. A non-transitory computer-readable medium storing computer program instructions that, when executed by a processor, cause the processor to carry out a method of operating a scalable computing system to generate one or more notifications, the method comprising:
  executing a plurality of independent management processes, wherein a first management process of the plurality of independent management processes corresponds to a first action definition of a plurality of action definitions, and the first management process is configured to:
    monitor a state of at least one operation defined in the first action definition;
      for a first operation of the at least one operation, identify a first worker process to perform the first operation, based on a state of the first operation, and assign the first worker process to perform the first operation; and
    upon detecting a predefined condition in at least one of the plurality of independent management processes, transmit, to a second processor, the one or more notifications.

\* \* \* \* \*